United States Patent
Facchinello et al.

(10) Patent No.: US 9,533,555 B2
(45) Date of Patent: Jan. 3, 2017

(54) TONNEAU COVER SYSTEM AND SIDE LOCK CLAMP

(71) Applicant: Extang Corporation, Ann Arbor, MI (US)

(72) Inventors: Jerome J. Facchinello, Grand Blanc, MI (US); Charles A. Fabros, Downers Grove, IL (US); Brian P. Kozlowski, Canton, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 14/874,795

(22) Filed: Oct. 5, 2015

(65) Prior Publication Data
US 2016/0096421 A1    Apr. 7, 2016

Related U.S. Application Data

(60) Provisional application No. 62/060,637, filed on Oct. 7, 2014.

(51) Int. Cl.
| | |
|---|---|
| *B65D 45/00* | (2006.01) |
| *B60J 7/19* | (2006.01) |
| *B60J 7/10* | (2006.01) |
| *B60J 7/14* | (2006.01) |

(52) U.S. Cl.
CPC ............ *B60J 7/198* (2013.01); *B60J 7/106* (2013.01); *B60J 7/102* (2013.01); *B60J 7/141* (2013.01)

(58) Field of Classification Search
CPC .......... B60J 7/198; B65D 45/00; B65D 45/04; B65D 45/10; B65D 45/16; B65D 45/24; B65D 45/322; E05C 19/18; E05C 19/182; E05C 19/184; E05C 19/186; E05C 19/188

USPC ...... 292/256, 258, 288; 296/100.02, 100.07; 248/220.21, 220.22, 221.11, 222.11, 248/222.13, 222.14, 222.52

See application file for complete search history.

(56) References Cited

U.S. PATENT DOCUMENTS

| | | | |
|---|---|---|---|
| 5,018,777 A * | 5/1991 | Swenson | B60J 7/1621 16/231 |
| 5,228,739 A * | 7/1993 | Love | F16B 2/065 248/229.24 |
| 5,460,423 A | 10/1995 | Kersting et al. | |
| 5,540,475 A | 7/1996 | Kersting et al. | |
| 5,655,808 A | 8/1997 | Wheatley | |
| 7,093,811 B2 * | 8/2006 | Wu | F16M 13/02 248/229.12 |
| 7,188,888 B2 | 3/2007 | Wheatley et al. | |

(Continued)

*Primary Examiner* — Matthew Ing
(74) *Attorney, Agent, or Firm* — Harness, Dickey & Pierce, PLC

(57) ABSTRACT

A clamp to secure a tonneau cover to a frame of a cargo box includes a first clamp member coupled to the tonneau cover and has a first clamping surface. A second clamp member is coupled to the tonneau cover and has a second clamping surface. A ramp mechanism can include at least one ramp surface between the first and second clamp members shaped to cause lateral translation of the second clamping surface toward the first clamping surface in response to axial movement of the second clamp member toward the first clamp member as the clamp moves from an unclamped position to a clamped position. When in the clamped position, the first clamping surface of the first clamp member can be in opposed relationship to the second clamping surface to apply a clamping force therebetween, which can reinforce and prevent permanent deformation of the frame.

20 Claims, 5 Drawing Sheets

(56) References Cited

U.S. PATENT DOCUMENTS

| | | |
|---|---|---|
| 7,258,387 B2 | 8/2007 | Weldy |
| 8,807,625 B2 | 8/2014 | Garska |
| 8,960,764 B2 | 2/2015 | Spencer |
| 2012/0274092 A1* | 11/2012 | Yue .......................... B60J 7/141 296/100.07 |
| 2014/0042754 A1 | 2/2014 | Spencer |
| 2015/0130212 A1 | 5/2015 | Spencer |
| 2016/0039274 A1* | 2/2016 | Smith ...................... B60J 7/102 296/100.02 |
| 2016/0114666 A1* | 4/2016 | Xu ........................... B60J 7/141 296/100.07 |

* cited by examiner

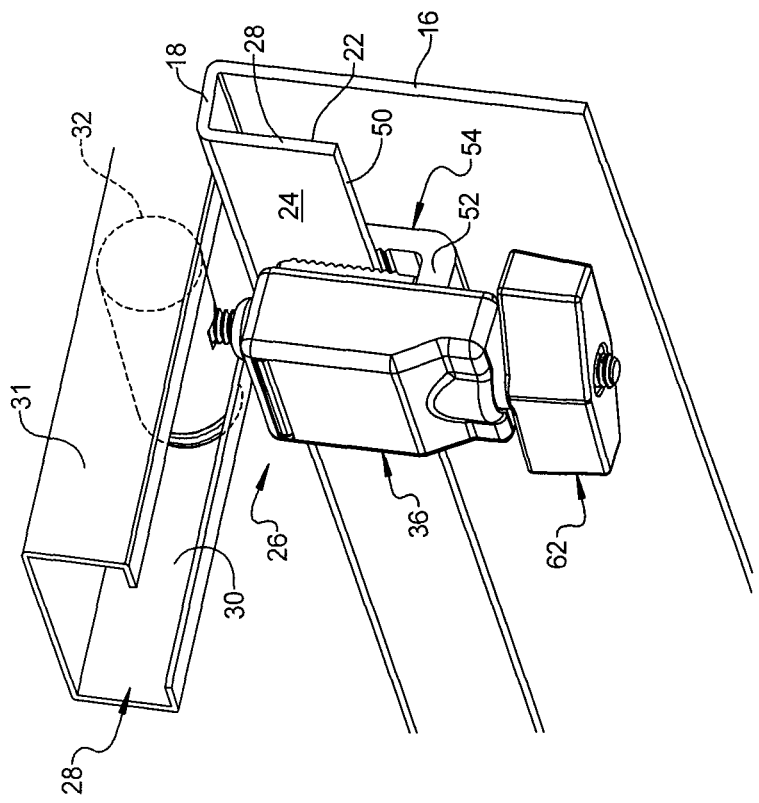
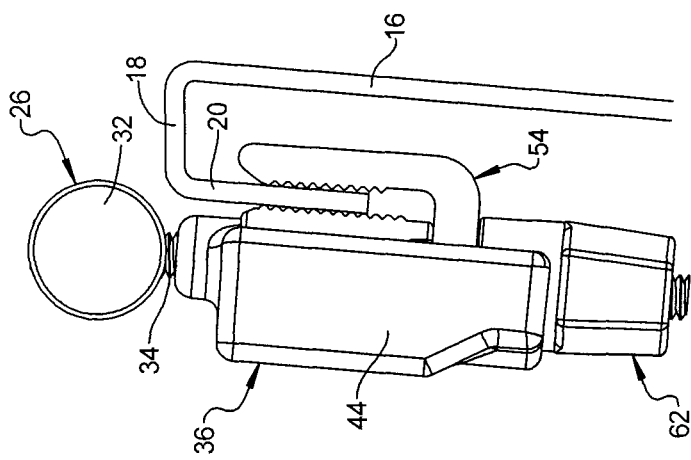

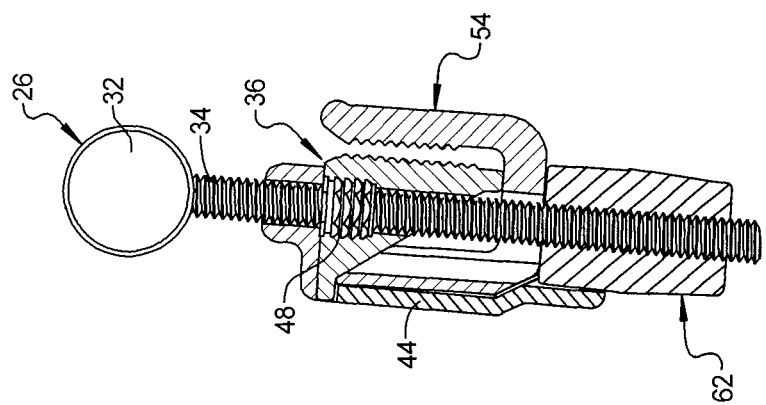
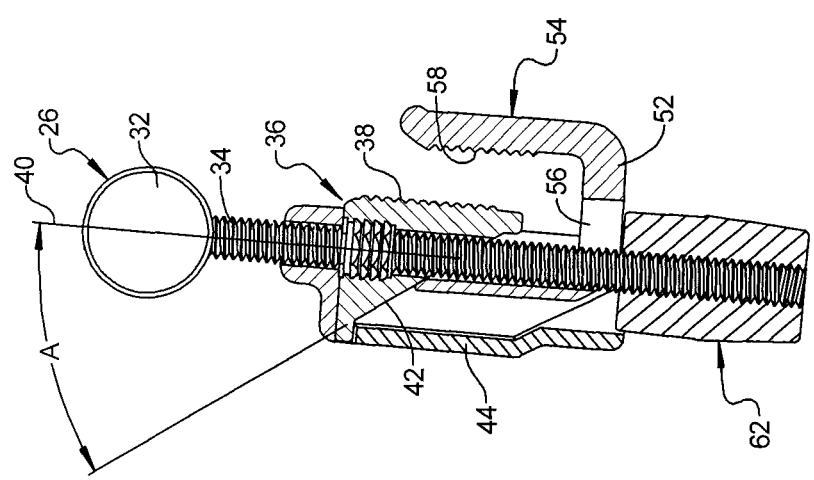
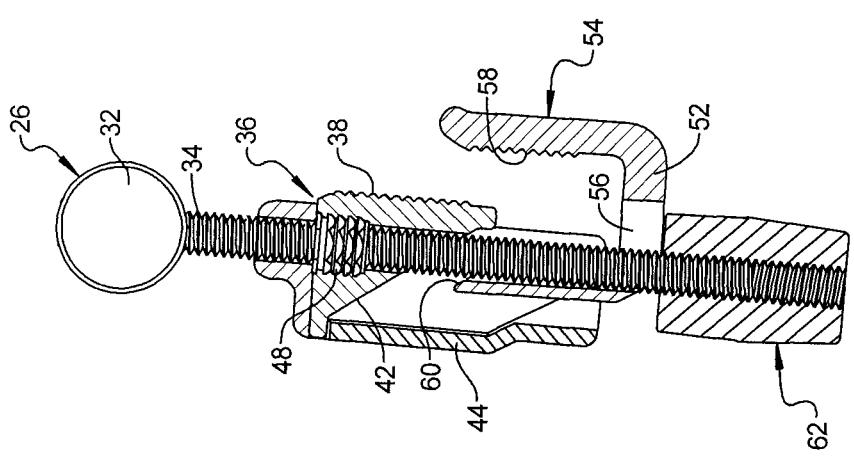

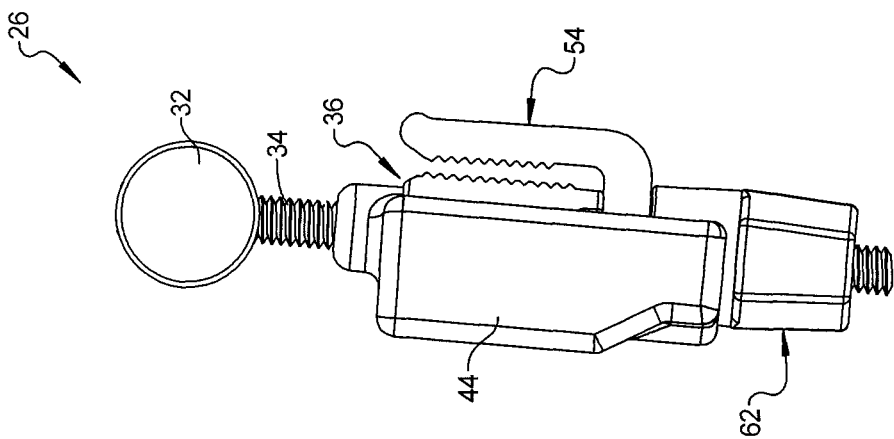
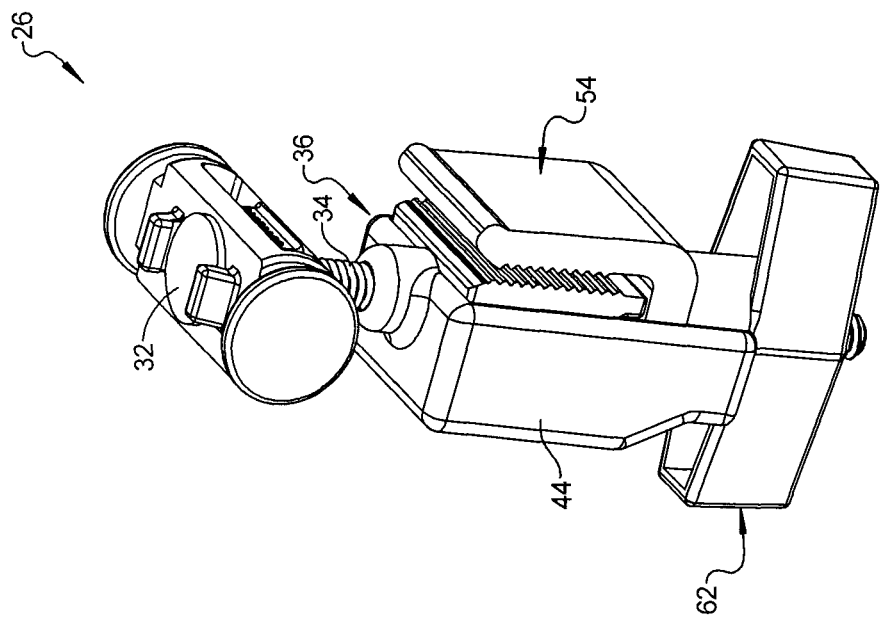

TONNEAU COVER SYSTEM AND SIDE LOCK CLAMP

CROSS-REFERENCE TO RELATED APPLICATIONS

This application claims the benefit of U.S. Provisional Application No. 62/060,637, filed on Oct. 7, 2014. The entire disclosure of the above application is incorporated herein by reference.

FIELD

The present disclosure relates to tonneau covers for vehicles. More particularly, the present disclosure relates to a clamp system for use in a tonneau cover system.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching or clamp system for coupling the frame network to the pickup truck and a means for stowing the clamp system, and a hinge system for hingedly coupling adjacent sections of the foldable tonneau cover. However, the known prior art fails to maximize the ease and effectiveness of foldable tonneau covers and, thus, many foldable tonneau covers suffer from numerous disadvantages.

By way of example, existing clamp systems generally employ an over-center cam lock arrangement, wing nut clamp arrangement, and/or spring biased clamp arrangement to fasten the tonneau cover in place relative to the pickup truck. The clamps typically hook onto the downwardly projecting (metal) flange of the truck bed. Such clamps, in the case of the cam lock arrangement, are adjustable by rotating a threaded cam pivot to permit attachment of the clamps to pickup trucks with differing length downwardly projecting flanges. The other clamping systems can use threaded portions or other telescoping type mechanisms to provide a length adjustment feature.

However, these clamping systems lead to various problems or failures when used with more recent pickup truck bed designs produced by original equipment manufacturers (OEM). For instance, many of the newer sidewall flanges of pickup truck beds can become deformed under the extreme load that can be exerted by clamping systems. In fact, several new vehicles being designed are contemplating changes to the flange material or reducing the flange thickness. The result is a less structural flange which could be distorted when using typical tonneau clamp designs clamped to such downwardly extending flanges of the truck bed box. Consequently, as a conventional tonneau cover clamp is tightened in place, a user can exert sufficient force that causes the sidewall flange of the pickup truck bed to become permanently deformed.

Accordingly, there exists a need in the relevant art to provide a tonneau cover system capable of overcoming the disadvantages of the prior art. Additionally, there exists a need to provide sufficient retention capability to retain the tonneau cover on the pickup truck bed, without causing permanent deformation.

SUMMARY

This section provides a general summary of the disclosure, and is not a comprehensive disclosure of its full scope or all of its features.

In accordance with one aspect of the present disclosure, a tonneau cover system for a cargo box, including a frame, of a pickup truck can include a tonneau cover for covering the cargo box. A clamp to secure the tonneau cover to the frame can include a first clamp member coupled to the tonneau cover and can have a first clamping surface. A second clamp member can be coupled to the tonneau cover and can have a second clamping surface. The second clamp member can be moveable relative to the first clamp member between an unclamped position and a clamped position. A ramp mechanism can include at least one ramp surface between the first and second clamp members shaped to cause lateral translation of the second clamping surface toward the first clamping surface in response to axial movement of the second clamp member toward the first clamp member as the clamp moves from the unclamped position to the clamped position. When in the clamped position, the first clamping surface of the first clamp member can be in opposed relationship to the second clamping surface to apply a clamping force therebetween.

In accordance with another aspect of the present disclosure, a tonneau cover system for a cargo box of a pickup truck is provided. The cargo box can include a frame having an outer wall, a ledge extending inboard from the outer wall and a flange extending downwardly from the ledge and spaced inboard from the outer wall. The flange can include an outboard side facing the outer wall and an inboard side opposite the outboard side. The tonneau cover system can include a tonneau cover for covering the cargo box and a clamp for securing the tonneau cover to the cargo box. The clamp can include a rod pivotably coupled to the tonneau cover and can have an axis. A first clamp member can be threadably mounted on the rod and can have a first clamping surface disposed to engage the flange. The first clamp member can have a first ramp surface extending at an angle relative to the axis of the rod. A second clamp member can be slidably mounted on the rod and can have a second clamping surface disposed to engage the flange. The second clamp member can be axially moveable along the rod and, in response to the axial movement, the second clamp member can be movable along the first ramp surface to cause translation of the second clamp member perpendicular to the axis toward the first clamp member from an unclamped position to a clamped position. A connector can be threadably mounted on the rod to engage and slide the second clamp member between the unclamped position and the clamped position. When in the clamped position, the first clamping surface of the first member can be positioned to engage the inboard side of the flange and the second clamping surface of the second clamp member can be positioned to engage an opposing portion of the outboard side of the flange to apply a clamping force to the flange.

In accordance with yet another aspect of the present disclosure, a tonneau cover clamp for clamping a tonneau cover to a downwardly extending flange spaced inboard from an outer wall of a cargo box of a pickup truck is provided. The tonneau cover clamp can include a rod that can have an axis extending from a pivotable coupling structured to couple the rod to the tonneau cover. A first clamp member can be coupled to the rod and can have a first clamping surface. A second clamp member can be coupled to the rod and can have a second clamping surface. A ramp mechanism can include at least one ramp surface between the first and second clamp members that can be shaped to cause translation of the second clamp member toward the first clamp member at an angle relative to the axis of the rod in response to movement of the second ramp member axially along the rod toward the first clamp member as the second clamp member moves from an unclamped position to a clamped position. A manually rotatable connector can be threadably mounted on the rod to engage and slide the second clamp member between the unclamped position and the clamped position. The first clamping surface can be positioned in opposing relationship to the second clamping surface to enable the first and second clamping surfaces to apply a clamping force to opposing sides of the downwardly extending flange when the second clamp member is in the clamped position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a side plan view of one exemplary embodiment of a side lock clamp of the tonneau cover system of FIG. 1 in a clamped position, with a partial cross-sectional view of a cargo box.

FIG. 3 is a partial perspective view of components of the tonneau cover system with side lock clamp of FIG. 2 in a clamped position, with a portion of the cargo box.

FIG. 4A is a cross-sectional view of the side lock clamp of FIG. 2 in an unclamped position.

FIG. 4B is a cross-sectional view of the side lock clamp of FIG. 4A in an intermediate unclamped position.

FIG. 4C is a cross-sectional view of the side lock clamp of FIG. 4A in a clamped position.

FIG. 5 is a perspective view of the side lock clamp of FIG. 2 in a clamped position.

FIG. 6 is a side plan view of the side lock clamp of FIG. 2 in a clamped position.

Corresponding reference numerals indicate corresponding parts throughout the several views of the drawings.

DETAILED DESCRIPTION

Example embodiments will now be described more fully with reference to the accompanying drawings.

Figure 1:
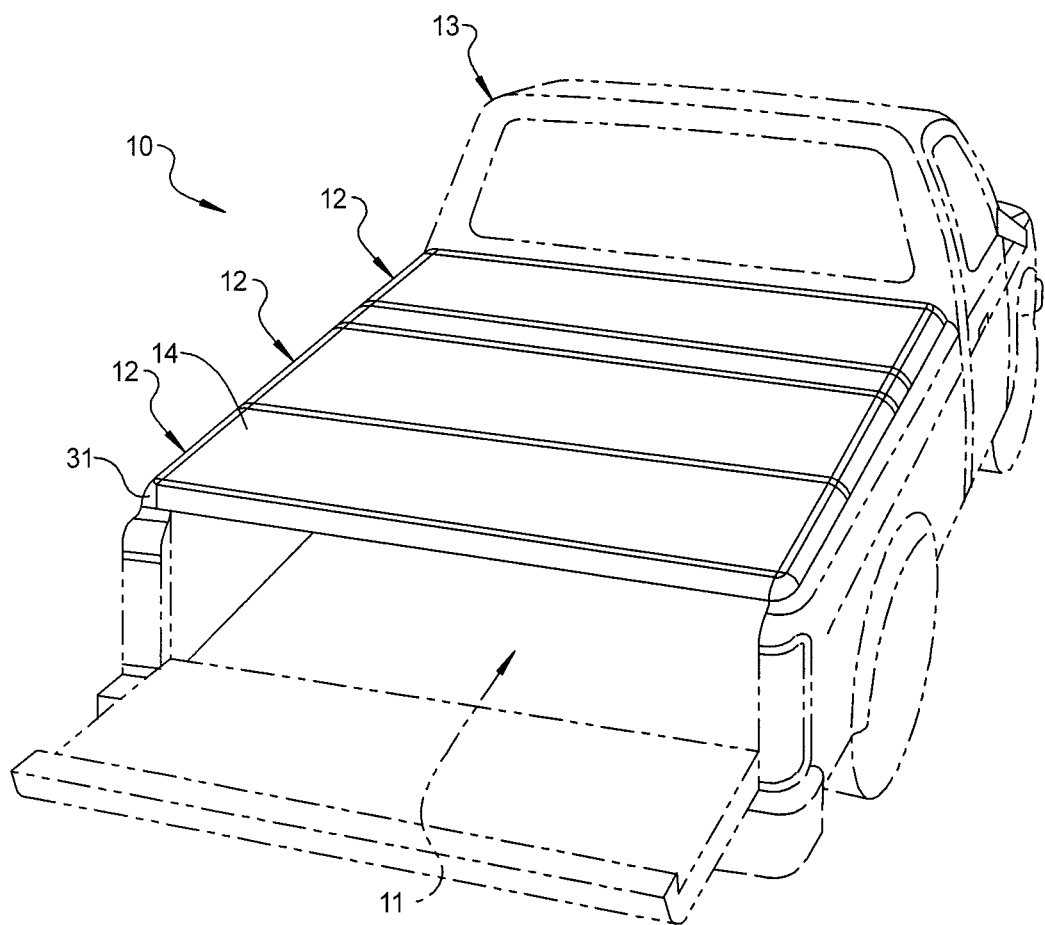
FIG. 1 is a perspective view of one exemplary embodiment of a tonneau cover system with a side lock clamp in accordance with the present disclosure.
Figure 7:
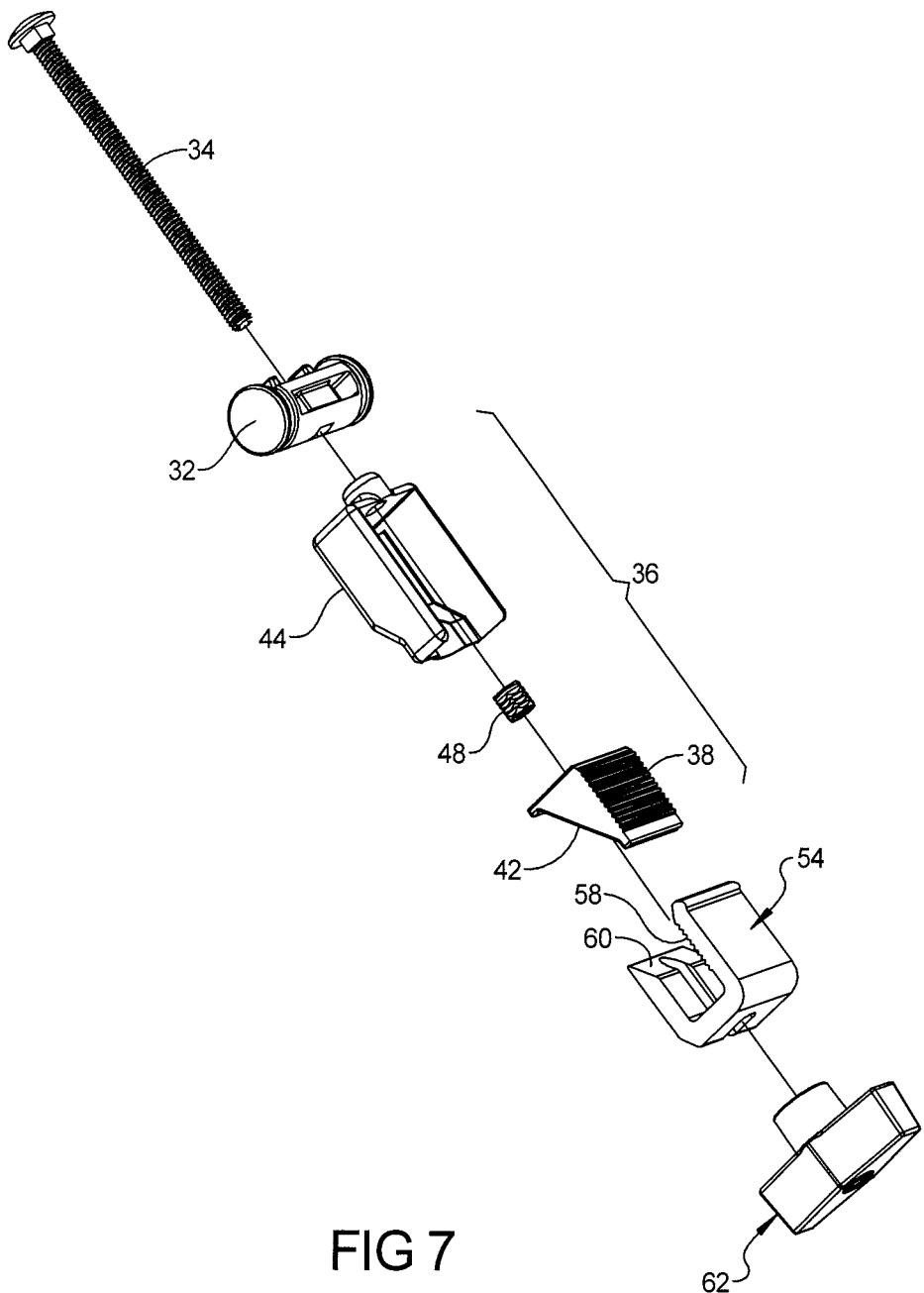
FIG. 7 is an exploded perspective view of the side lock clamp of FIG. 2.

FIGS. 1-7 illustrate one exemplary tonneau cover system 10 for covering a truck bed or cargo box 11 in accordance with the present disclosure. In some cases, the truck bed or cargo box 11 can be part of a pickup truck 13 as shown. The cargo box 11 includes a frame that can have an outer wall 16, a ledge 18 extending inboard from the outer wall 16 and a flange 20 extending downwardly from the ledge 18 and spaced inboard from the outer wall 16. The flange 20 includes an outboard face or side 22 facing the outer wall 16 and an inboard face or side 24 opposite the outboard side 22.

In some embodiments, the tonneau cover 10 can include a plurality of sections 12 foldable between a deployed arrangement covering the truck bed 11 and a folded arrangement wherein the sections 12 are stacked, allowing access to the truck bed 11. In some embodiments, each section 12 of the tonneau cover system 10 can comprise a plurality of frame and/or bow members 31 that together form a rectangular frame supporting a fabric, textile or other flexible sheet material 14 spanning the rectangular frame 31. In some embodiments, each of the plurality of tonneau sections 12 can alternatively comprise a generally rigid panel as the spanning material 14, and which can optionally include frame members 31 around the periphery of the rigid panel 14 that can similarly form the rectangular frame 31. Other tonneau cover configurations are, of course, possible.

The tonneau cover system 10 can include a side lock clamp 26 pivotably coupled to one of the frame members 31. For example, the frame member 31 can comprise an extruded metal rail having a C-shaped cross-section defining a longitudinal internal channel 28 with a longitudinally extending central opening 30. A barrel member 32 can be rotatably and slidably retained within the channel 28. The clamp 26 can include a rod 34 that can be threadably coupled to the barrel member 32. The rod 34 can extend out of the channel 28 through the opening 30 to pivotably couple the clamp 26 to the frame member 31.

A first clamp member 36 can be threadably coupled to the rod 34 via threaded insert 48. The first clamp member 36 can include a first clamping surface 38 that can extend generally parallel to the longitudinal or central axis 40 of the rod 34. The first clamping surface 38 can be disposed to engage the inboard side 24 of the flange 20. The first clamp member 36 can also include a first ramp surface 42 extending at an acute angle A relative to the axis 40 of the rod 34. In some embodiments, the first clamp member 36 can additionally be integrated with a housing portion 44 defining an interior cavity 46. As illustrated, the housing portion 44 can be a separate component of the first clamp member 36. Alternatively, a single piece component can provide any combination or all of the housing portion 44, the ramp surface 42, and the first clamping surface 38 of the first clamp member 36.

In the illustrated embodiment, it should be apparent that the housing portion 44 component is integrated with the other component portion of the first clamp member 36 in the sense that they move together along the axis 40 of the rod 34. As noted above, the first clamp member 36 can be rotated clockwise or counter-clock wise on the post 34 so that threads of the post 34 and of the insert 48 of the first clamp member 36 cooperate to adjust the first clamp member 36 upwardly toward or downwardly away from the barrel 32 or tonneau cover 14 by turning on the bolt. In some cases, the clamp 26 can be positioned to be as high as possible when in the clamped position (e.g., FIG. 3) without a base 52 of the clamp 26 touching the bottom or distal edge 50 of the flange 20.

A second clamp member 54 can be mounted on the rod 34 via an aperture 56 such that the second clamp member 54 can be slidably coupled to the rod 34. The second clamp member 54 can include a second clamping surface 58 that can extend substantially parallel to the first clamping surface 38. The second clamp member 54 can include a second ramp surface 60 extending at a complementary angle to the acute angle A and disposed to engage against the first ramp surface 42. The second clamp member 54 can be axially moveable relative to the first clamp member 36 along the rod 34. In response to this axial movement, the second ramp surface 60 of the second clamp member 54 can also move along the first ramp surface 42 of the first clamp member 36 which can cause translation of the second clamp member 54 relative to and toward the first clamp member 36 and in a direction that is perpendicular to the axis A as the second clamp member 54 moves from an unclamped position to a clamped position relative to the first clamp member 36.

The side lock clamp 26 can further include a manually rotatable threaded connector or wing nut 62. This manually rotatable threaded connector 62 can be threaded onto the rod 34, where it can engage the second clamp member 54. Thus, manual clockwise rotation of the threaded connector 62 can cause the axial movement of the second clamp member 54 along the rod 34, and the resulting perpendicular movement driven by the sliding contact of the first ramp surface 42 and the second ramp surface 60 as the clamp moves from its unclamped position to its clamped position. Of course, alternative cooperating coupling and driving members, beyond the illustrated cooperating threads, can be provided on the rod 34 and the connector 62 to enable engagement of the ramp surfaces 42 and 60, via movement under influence of a driving member 62 of the second clamp member relative 54 to the first clamp member 36.

FIG. 4A illustrates one embodiment of the clamp 26 in an unclamped position. In this unclamped position, the second ramp surface 60 of the second clamp member 54 is axially spaced from the first ramp surface 42 of the first ramp surface. In other words, there is a gap or space between the first and second ramp surfaces 42 and 60, respectively. FIG. 4A illustrates another unclamped position in which the second ramp surface 60 of the second clamp member 54 have just initially contacted each other, eliminating the gap or space therebetween. Thus, the second clamp member 54 has moved relative to the first clamp member 36 in a purely axial direction of the rod 34 from FIG. 4A to FIG. 4B. In other words, the second clamp member has not undergone any lateral or perpendicular translation or movement relative to the axis 40 of the rod 34, or relative to the first clamp member 36.

In contrast, FIG. 4C illustrates one embodiment of the clamp 26 in a clamped position. In moving from the unclamped position illustrated in FIG. 4B to the clamped position illustrated in FIG. 4C, continued clockwise rotation of the threaded connector 62 continues the axial movement, resulting in the second ramp surface 60 of the second clamp member 54 moving along the first ramp surface 42 of the first clamp member 36 causing translation of the second clamp member 54 relative to and toward the first clamp member 36 and in a direction that is perpendicular to the axis A of the rod 34. Thus, the second clamp member 54 has moved relative to the first clamp member 36 in both an axial direction and a direction perpendicular thereto from FIG. 4B to FIG. 4C. In other words, the second clamp member 54 has undergone both axial and lateral or perpendicular translation or movement relative to the axis 40 of the rod 34, or relative to the first clamp member 36.

Referring to FIGS. 2 and 3, this embodiment of the clamp 26 is illustrated in a clamped position similar to FIG. 4C. As illustrated, the first clamping surface 38 of the first clamp member 36 engages the inboard side 24 of the flange 20 and the second clamping surface 58 of the second clamp member 54 engages the outboard side 22 of the flange 20 to apply a compressive clamping force to the flange 20. As illustrated, both the first and second clamping surfaces, 38 and 58, directly engage against the opposing sides or faces, 24 and 22, respectively, of the flange 20. In other embodiments, one or both of the first and second clamping surfaces, 38 and 58, may indirectly engage the opposing sides or faces, 24 and 22, respectively, of the flange 20. For example, another component of the tonneau cover system 10, such as a plastic cover material, might overlay one or both sides of the flange 20.

In some embodiments, the clamping surfaces, 38 and 58, can have a rectangular or other shape that has both a longitudinally (generally vertically) extending dimension and a laterally (generally horizontally) extending dimension that is sufficient to reinforce the flange 20 and eliminate or minimize permanent deformation of the flange 20 under the loads transmitted by the clamp 26 from the tonneau cover 10 to the flange 20 during normal vehicle operation. For example, even if the clamp 26 ultimately engaged the distal end 50 of the flange 20 and applied a meaningful upwardly directed force thereto, the reinforcing effect of the clamping surfaces, 38 and 58, could eliminate or minimize such permanent deformation of the flange 20.

In some cases, the clamp 26 can be coupled to a rail of the foremost tonneau section 12. For example, the rail(s) 31 to which a side lock clamp 26 is coupled can include a header and cross-rail of such a foremost tonneau section 12. Other positions are possible in other cases. For example, the clamp 26 can be coupled to a side rail and to rail members of an intermediate or aft-most tonneau cover section 12.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Features or elements that are "integral" or "integrated" together include both instances where they are initially formed as portions of a single piece component, and instances where they are initially formed as portions of multiple separate components that are subsequently coupled together into a single unit.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a frame, the tonneau cover system comprising:
   a tonneau cover for covering the cargo box, and
   a clamp to secure the tonneau cover to the frame, the clamp comprising:
   a first clamp member coupled to the tonneau cover and having a first clamping surface;
   a second clamp member coupled to the tonneau cover and having a second clamping surface, the second clamp member being moveable relative to the first clamp member between an unclamped position and a clamped position; and
   a ramp mechanism including at least one ramp surface between the first and second clamp members shaped to cause lateral translation of the second clamping surface toward the first clamping surface in response to movement of the second clamp member toward the tonneau cover as the clamp moves from the unclamped position to the clamped position;
   wherein, when in the clamped position, the first clamping surface of the first clamp member is in opposed relationship to the second clamping surface to apply a clamping force therebetween.

2. The tonneau cover system according to claim 1, wherein the clamp further comprises a rod upon which the first clamp member and second clamp member are mounted, and by which the first and second clamp members are pivotably coupled to the tonneau cover.

3. The tonneau cover system according to claim 2, wherein the first clamp member is threadably mounted on the rod and the second clamp member is slidably mounted on the rod.

4. The tonneau cover system according to claim 2, wherein the first clamp member is threadably mounted on the rod allowing a distance from the tonneau cover to the first clamp member to be adjusted by rotation of the first clamp member relative to the rod.

5. The tonneau cover system according to claim 1, further comprising a manually rotatable connector threadably mounted on a rod, wherein the second clamp member is slidably mounted on the rod, and wherein the manually rotatable connector is positioned to engage the second clamp member and cause the second clamp member slide to along the rod to move from the unclamped position to the clamped position.

6. The tonneau cover system according to claim 5, wherein the first clamp member is threadably mounted on the rod.

7. The tonneau cover system according to claim 1, wherein the first and second clamp members are mounted on a rod defining an axis, and wherein a first of the at least one ramp surface extends at an acute angle relative to the axis and is integral with the first clamp member.

8. The tonneau cover system according to claim 7, wherein a second of the at least one ramp surface extends at a complementary angle to the acute angle and is integral with the second clamp member.

9. The tonneau cover system according to claim 1, wherein, when in the clamped position, the first and second clamping surfaces are positioned to apply a clamping force to the frame throughout an area defined by overlapping opposing contacting portions of the first and second clamping surfaces, with the area having dimensions that are large enough to reinforce the frame sufficiently to avoid permanent deformation of the frame under loads transmitted by the clamp to the frame during normal vehicle operation.

10. A tonneau cover system for a cargo box of a pickup truck, the cargo box comprising a frame including an outer wall, a ledge extending inboard from the outer wall and a flange extending downwardly from the ledge and spaced inboard from the outer wall, the flange including an outboard side facing the outer wall and an inboard side opposite the outboard side, the tonneau cover system comprising:
- a tonneau cover for covering the cargo box; and
- a clamp for securing the tonneau cover to the cargo box, the clamp comprising:
  - a rod pivotably coupled to the tonneau cover and having an axis;
  - a first clamp member threadably mounted on the rod and having a first clamping surface disposed to engage the flange, the first clamp member having a first ramp surface extending at an angle relative to the axis of the rod;
  - a second clamp member slidably mounted on the rod and having a second clamping surface disposed to engage the flange, the second clamp member being axially moveable along the rod and, in response to the axial movement, the second clamp member being movable along the first ramp surface to cause translation of the second clamp member perpendicular to the axis toward the first clamp member from an unclamped position to a clamped position;
  - a connector threadably mounted on the rod to engage and slide the second clamp member between the unclamped position and the clamped position;
  - wherein, when in the clamped position, the first clamping surface of the first member is positioned to engage the inboard side of the flange and the second clamping surface of the second clamp member is positioned to engage an opposing portion of the outboard side of the flange to apply a clamping force to the flange.

11. The tonneau cover system according to claim 10, wherein the first ramp surface extends at an acute angle relative to the axis of the rod.

12. The tonneau cover system according to claim 11, wherein the second clamp member includes a second ramp surface extending at a complementary angle to the acute angle, and wherein the second ramp surface is disposed to engage against the first ramp surface.

13. The tonneau cover system according to claim 10, wherein the rod is pivotably coupled to the tonneau cover via a barrel member configured to slide along a channel in a rail member of the tonneau cover.

14. The tonneau cover system according to claim 10, wherein connector is manually rotatable.

15. The tonneau cover system according to claim 10, wherein, when in the clamped position, the clamping surfaces are positioned to apply a clamping force to the flange throughout an area defined by overlapping opposing contacting portions of the clamping surfaces, with the area having dimensions that are large enough to reinforce the flange sufficiently to avoid permanent deformation of the flange under loads transmitted by the clamp to the flange during normal vehicle operation.

16. A tonneau cover clamp for clamping a tonneau cover to a downwardly extending flange spaced inboard from an outer wall of a cargo box of a pickup truck, the tonneau cover clamp comprising:
- a rod having an axis extending from a pivotable coupling structured to couple the rod to the tonneau cover;
- a first clamp member coupled to the rod and having a first clamping surface;
- a second clamp member coupled to the rod and having a second clamping surface;
- a ramp mechanism including at least one ramp surface between the first and second clamp members shaped to cause translation of the second clamp member toward the first clamp member at an angle relative to the axis of the rod in response to movement of the second ramp member axially along the rod toward the first clamp member as the second clamp member moves from an unclamped position to a clamped position; and
- a manually rotatable connector threadably mounted on the rod to engage and slide the second clamp member between the unclamped position and the clamped position;
- wherein, the first clamping surface is positioned in opposing relationship to the second clamping surface to enable the first and second clamping surfaces to apply a clamping force to opposing sides of the downwardly extending flange when the second clamp member is in the clamped position.

17. The tonneau cover system according to claim 16, wherein a first of the at least one ramp surface extends at an acute angle relative to the axis and is integral with the first clamp member.

18. The tonneau cover system according to claim 17, wherein a second of the at least one ramp surface extends at a complementary angle to the acute angle and is integral with the second clamp member.

19. The tonneau cover system according to claim 16, wherein the pivotable coupling is a barrel member configured to slide along a channel of a tonneau cover rail member.

20. The tonneau cover system according to claim 16, wherein both clamping surfaces extend substantially parallel to the axis of the rod when in the clamped position.

* * * * *